US012684445B2

(12) United States Patent
Singh et al.

(10) Patent No.: US 12,684,445 B2
(45) Date of Patent: Jul. 14, 2026

(54) METHODOLOGY OF Wi-Fi ACCESS POINT SELECTION FOR IMS CALL OVER Wi-Fi

(71) Applicant: MediaTek Singapore Pte. Ltd., Singapore (SG)

(72) Inventors: Pawanjeet Singh, Noida (IN); Shailendra Singh, Noida (IN); Sameer Sethi, Noida (IN)

(73) Assignee: MediaTek Singapore Pte. Ltd., Singapore (SG)

( * ) Notice: Subject to any disclaimer, the term of this patent is extended or adjusted under 35 U.S.C. 154(b) by 297 days.

(21) Appl. No.: 18/429,260

(22) Filed: Jan. 31, 2024

(65) Prior Publication Data

US 2024/0430770 A1    Dec. 26, 2024

(30) Foreign Application Priority Data

Jun. 26, 2023    (IN) ............................. 202321042597

(51) Int. Cl.
*H04W 36/30* (2009.01)
*H04W 36/08* (2009.01)
*H04W 84/12* (2009.01)

(52) U.S. Cl.
CPC ......... *H04W 36/304* (2023.05); *H04W 36/08* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 9,414,354 B2 * | 8/2016 | Dhammawat | ........... | H04L 69/16 |
| 9,516,688 B2 * | 12/2016 | Konstantinou | ....... | H04W 76/16 |
| 10,477,349 B2 * | 11/2019 | Sinha | ....................... | H04W 8/18 |
| 11,019,454 B2 * | 5/2021 | Sinha | ....................... | H04W 8/18 |
| 11,140,620 B2 * | 10/2021 | Cuevas Ramirez | .. | H04W 88/06 |
| 11,147,010 B2 * | 10/2021 | Cuevas Ramirez | .. | H04W 84/12 |
| 11,218,917 B2 * | 1/2022 | Lin | ..................... | H04L 65/1016 |
| 11,758,355 B2 * | 9/2023 | Sinha | ....................... | H04W 4/02 455/456.3 |
| 11,974,218 B2 * | 4/2024 | Cuevas Ramirez | .. | H04W 84/12 |
| 2009/0147772 A1 * | 6/2009 | Rao | ....................... | H04L 67/535 370/352 |
| 2011/0249658 A1 * | 10/2011 | Wohlert | .................. | H04L 67/54 370/351 |
| 2014/0153489 A1 * | 6/2014 | Perras | .................... | H04W 60/00 370/328 |
| 2014/0321328 A1 * | 10/2014 | Zuniga | .................... | H04W 8/24 370/254 |
| 2016/0057728 A1 * | 2/2016 | Dhammawat | ......... | H04W 72/53 455/456.6 |
| 2019/0253836 A1 * | 8/2019 | Sinha | ....................... | H04W 8/04 |
| 2020/0100175 A1 * | 3/2020 | Cuevas Ramirez | .. | H04W 88/06 |
| 2020/0107254 A1 * | 4/2020 | Cuevas Ramirez | .. | H04W 88/06 |

(Continued)

*Primary Examiner* — Faiyazkhan Ghafoerkhan
(74) *Attorney, Agent, or Firm* — Winston Hsu

(57) ABSTRACT

A method of Wi-Fi access point (AP) selection including connecting user equipment (UE) with a first Wi-Fi AP, establishing connection with an IMS Network for an IMS call, exchanging a plurality of first messages between UE and a network if the first Wi-Fi AP is connected to the UE, observing first network metrics of the plurality of first messages by the UE, and disconnecting the first Wi-Fi AP and connecting a second Wi-Fi AP with the UE for the observation of the second network metrics.

23 Claims, 4 Drawing Sheets

(56) References Cited

U.S. PATENT DOCUMENTS

| | | | | |
|---|---|---|---|---|
| 2020/0107255 | A1* | 4/2020 | Cuevas Ramirez .. | H04W 88/06 |
| 2020/0145784 | A1* | 5/2020 | Sinha ................... | H04W 4/023 |
| 2020/0205044 | A1* | 6/2020 | Lin ....................... | H04W 76/12 |
| 2021/0368292 | A1* | 11/2021 | Sinha ................... | H04W 4/023 |
| 2024/0430770 | A1* | 12/2024 | Singh ................... | H04W 76/15 |

* cited by examiner

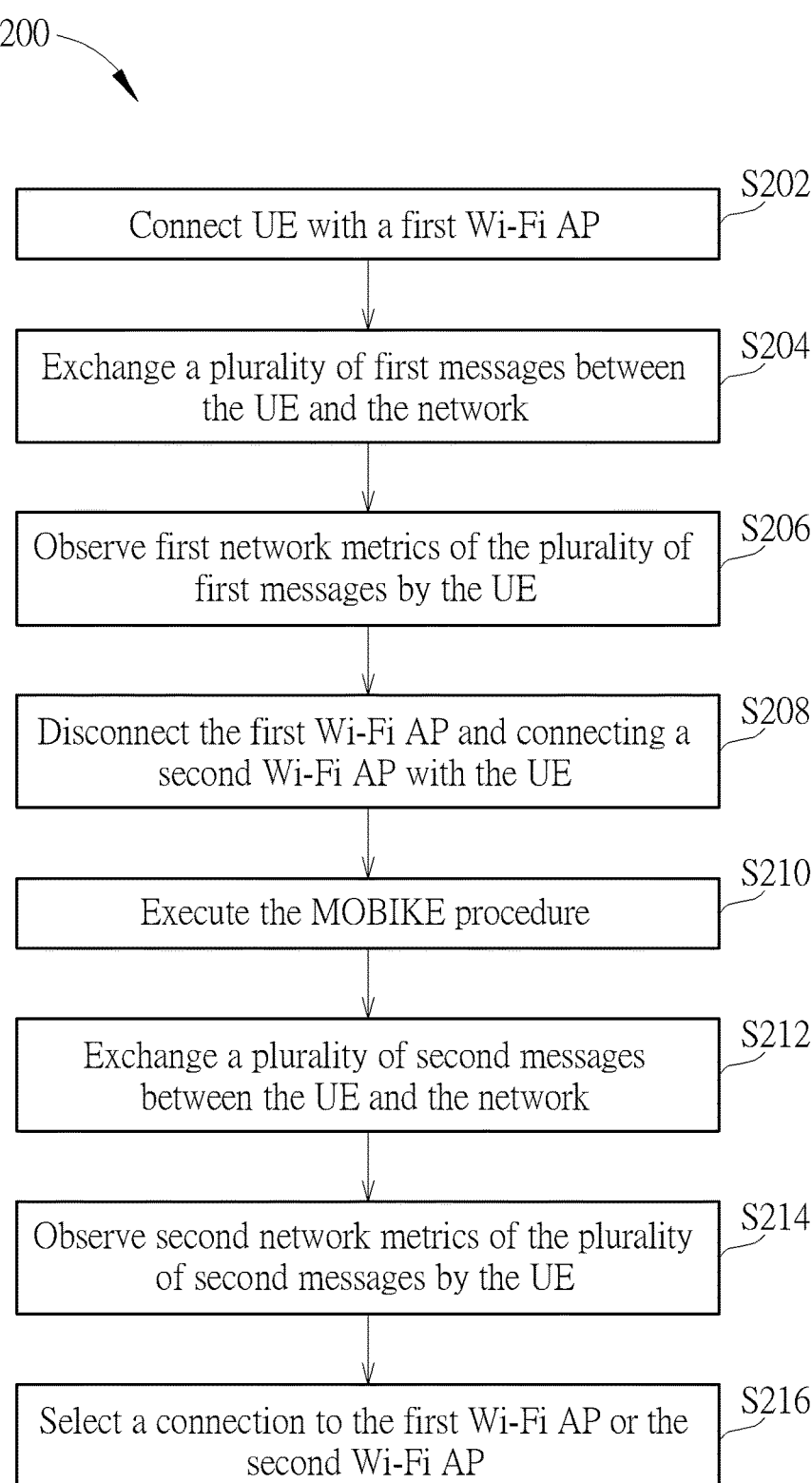

200

S202
Connect UE with a first Wi-Fi AP

S204
Exchange a plurality of first messages between the UE and the network

S206
Observe first network metrics of the plurality of first messages by the UE

S208
Disconnect the first Wi-Fi AP and connecting a second Wi-Fi AP with the UE

S210
Execute the MOBIKE procedure

S212
Exchange a plurality of second messages between the UE and the network

S214
Observe second network metrics of the plurality of second messages by the UE S216
Select a connection to the first Wi-Fi AP or the second Wi-Fi AP

FIG. 2

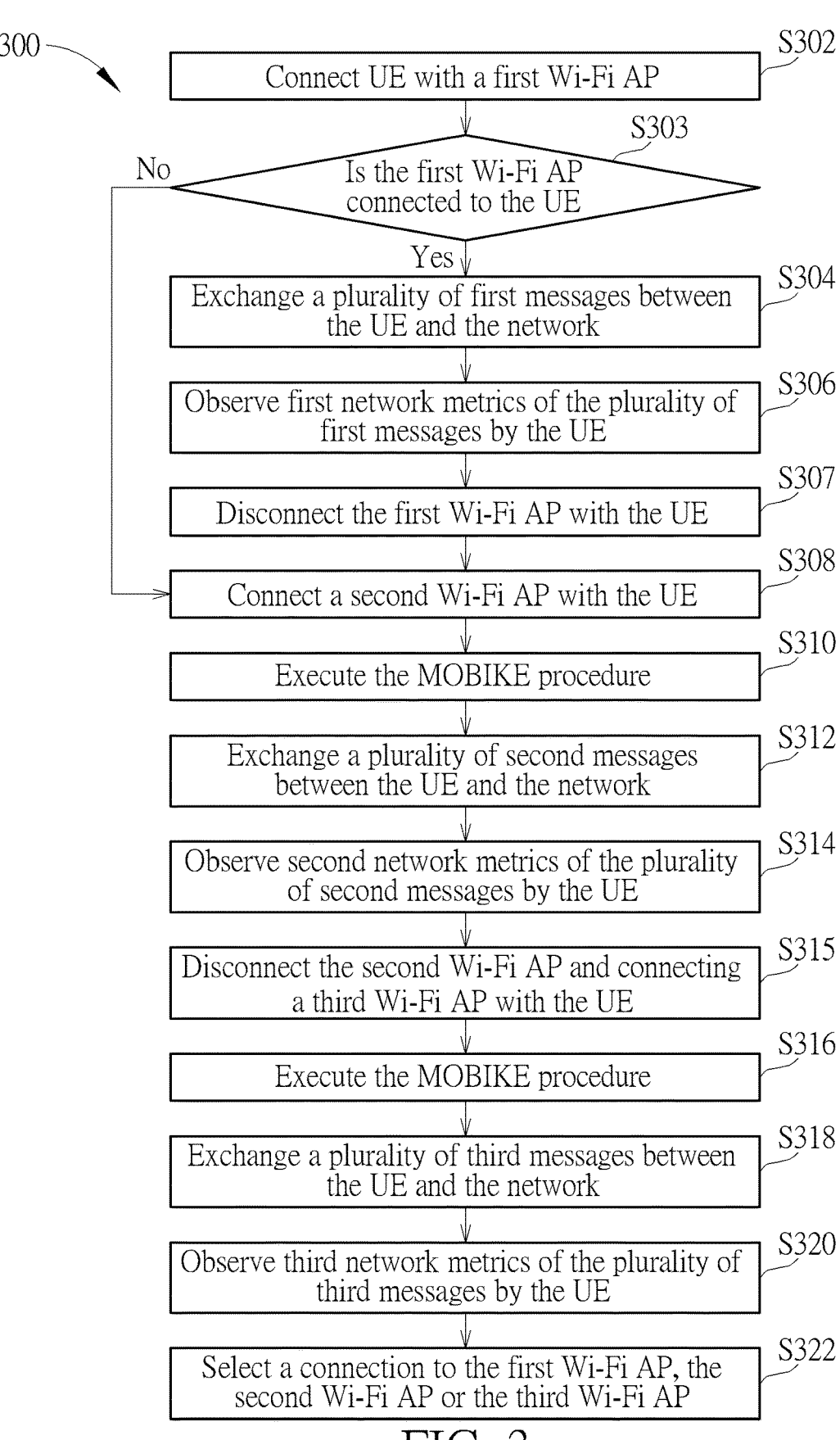

300

S302
Connect UE with a first Wi-Fi AP

S303
Is the first Wi-Fi AP connected to the UE

No

Yes

S304
Exchange a plurality of first messages between the UE and the network

S306
Observe first network metrics of the plurality of first messages by the UE

S307
Disconnect the first Wi-Fi AP with the UE

S308
Connect a second Wi-Fi AP with the UE

S310
Execute the MOBIKE procedure

S312
Exchange a plurality of second messages between the UE and the network

S314
Observe second network metrics of the plurality of second messages by the UE S315
Disconnect the second Wi-Fi AP and connecting a third Wi-Fi AP with the UE S316
Execute the MOBIKE procedure S318
Exchange a plurality of third messages between the UE and the network S320
Observe third network metrics of the plurality of third messages by the UE S322
Select a connection to the first Wi-Fi AP, the second Wi-Fi AP or the third Wi-Fi AP

FIG. 3

METHODOLOGY OF Wi-Fi ACCESS POINT SELECTION FOR IMS CALL OVER Wi-Fi

BACKGROUND

Wi-Fi is a family of wireless network protocols based on the IEEE 802.11 family of standards, which are commonly used for local area networking of devices and Internet access, allowing nearby digital devices to exchange data by radio waves. Wi-Fi uses multiple parts of the IEEE 802 protocol family and is designed to work seamlessly with Ethernet. Compatible devices can network through wireless access points with each other as well as with wired devices and the Internet. Different versions of Wi-Fi are specified by various IEEE 802.11 protocol standards, with different radio technologies that determine radio bands, maximum ranges, and speeds that may be achieved. Wi-Fi most commonly uses the 2.4 Ghz (120 mm) and 5 Ghz (60 mm) radio bands.

The IP Multimedia Subsystem (IMS) is a standardized architectural framework developed by the 3GPP for delivering IP multimedia services. Historically, mobile phones have provided voice call services over a circuit-switched-style network, rather than strictly over an IP packet-switched network. Alternative methods of delivering voice (VoIP) or other multimedia services have become available on smartphones, but they have not become standardized across the industry. IMS is an architectural framework that provides such standardization. IMS uses Internet Engineering Task Force (IETF) protocols, e.g., the Session Initiation Protocol (SIP). According to the 3GPP, IMS is utilized to aid the access of multimedia and voice applications from wireless and wireline terminals, i.e., to create a form of fixed-mobile convergence (FMC). This is done by having a horizontal control layer that isolates the access network from the service layer. From a logical architecture perspective, services need not have their own control functions, as the control layer is a common horizontal layer. However, in implementation this does not necessarily map into reduced cost and complexity.

As telephony technology evolved, IMS calling services such as voice over Wi-Fi (VoWiFi), reduce loading of cellular data over 3GPP access networks. Thus, Wi-Fi connectivity is the backbone to such IMS calling service. Currently, Wi-Fi access point (AP) selection is generally performed by users. There is no automatic mechanism to find a Wi-Fi network and select intelligently based on Wi-Fi network metrics other than the Wi-Fi signal strength. A solution to intelligently select a Wi-Fi AP based on network metrics of the available Wi-Fi AP options for VoWiFi service is urgently needed for IMS calling over Wi-Fi.

To provide telephony services over PS (Packet Switched) based network (like 4G or 5G), user equipment (UE) connects to PDN (Packet Data Network) or DN (Data Network) in 5G network using IMS (IP Multimedia Subsystem) APN (Access Point Name) or DNN (Data Network Name). IMS PDN or IMS PDU (Packet Data Unit) is established to get access to IMS network. Then it can perform IMS registration and subscribes IMS based services (telephony services like Voice, SMS etc.)

3GPP has provided specifications to support Wi-Fi offloading and ensures interoperability and integration between 3GPP and non-3GPP access. Reducing congestion and improving data speeds on cellular networks is primary goal behind the Wi-Fi offloading concept while leveraging existing infrastructure of Wi-Fi (Non-3GPP access networks) for better user experience.

To support Wi-Fi offloading, the UE needs to connect via non-3gpp access (i.e., Wi-Fi) to securely connect to 3GPP Core Network. Next, the core network may allow further access to PDN/DN, such as IMS network. Non-3GPP access to the core network can be provided as trusted or untrusted IP network accesses. Untrusted Non-3GPP access is provided by the core network through IP secured connection. IKEv2 (Internet Key Exchange v2) Protocol along with other protocols, e.g., Extensible Authentication Protocol Method for 3rd Generation Authentication and Key Agreement (EAP-AKA), and IKEv2 Mobility and Multihoming Protocol (MOBIKE), can be used to establish IP secured connection between the UE and the core network. 3GPP core network can further provide connectivity to PDN or DN Gateway for corresponding services. Data traffic (e.g., IMS voice data) received from the UE via non-3GPP access (i.e., Wi-Fi) to the core network is transmitted through IP Secured Tunnel (IPSEC protocol), which may be already established between the UE and the core network.

Connectivity via Non-3GPP access, such as Wi-Fi, can serve as a backbone for telephony services provided by the network. Thus, some methodology is required to derive such Wi-Fi access that is best performed for IMS call offloading over Wi-Fi.

SUMMARY

An embodiment provides a method of Wi-Fi access point (AP) selection comprising connecting user equipment (UE) with a first Wi-Fi AP, establishing connection with an IMS Network for establishing an IMS call, exchanging a plurality of first messages between the UE and a network if the first Wi-Fi AP is connected to the UE, observing first network metrics of the plurality of first messages by the UE, and disconnecting the first Wi-Fi AP and connecting a second Wi-Fi AP with the UE for the observation of the second network metrics.

Another embodiment provides a method of Wi-Fi access point (AP) selection comprising connecting user equipment (UE) with a first Wi-Fi AP, establishing connection with IMS Network for establishing an IMS call, disconnecting the first Wi-Fi AP and connecting a second Wi-Fi AP with the UE, executing an IKEv2 Mobility and Multihoming Protocol (MOBIKE) procedure, exchanging a plurality of second messages between the UE and a network, and observing second network metrics of the plurality of second messages by the UE.

Another embodiment provides a method of Wi-Fi access point (AP) iteration comprising connecting user equipment (UE) with a first Wi-Fi AP, establishing connection with IMS Network for establishing an IMS call, disconnecting the connected Wi-Fi AP and connecting a next Wi-Fi AP with the UE, executing an IKEv2 Mobility and Multihoming Protocol (MOBIKE) procedure, exchanging a plurality of messages between the UE and a network, and observing network metrics of the plurality of messages by the UE.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 depicts a flowchart of the method of Wi-Fi AP selection of an embodiment.

FIG. 3 depicts a flowchart of the method of Wi-Fi AP selection of another embodiment.

DETAILED DESCRIPTION

Figure 1:
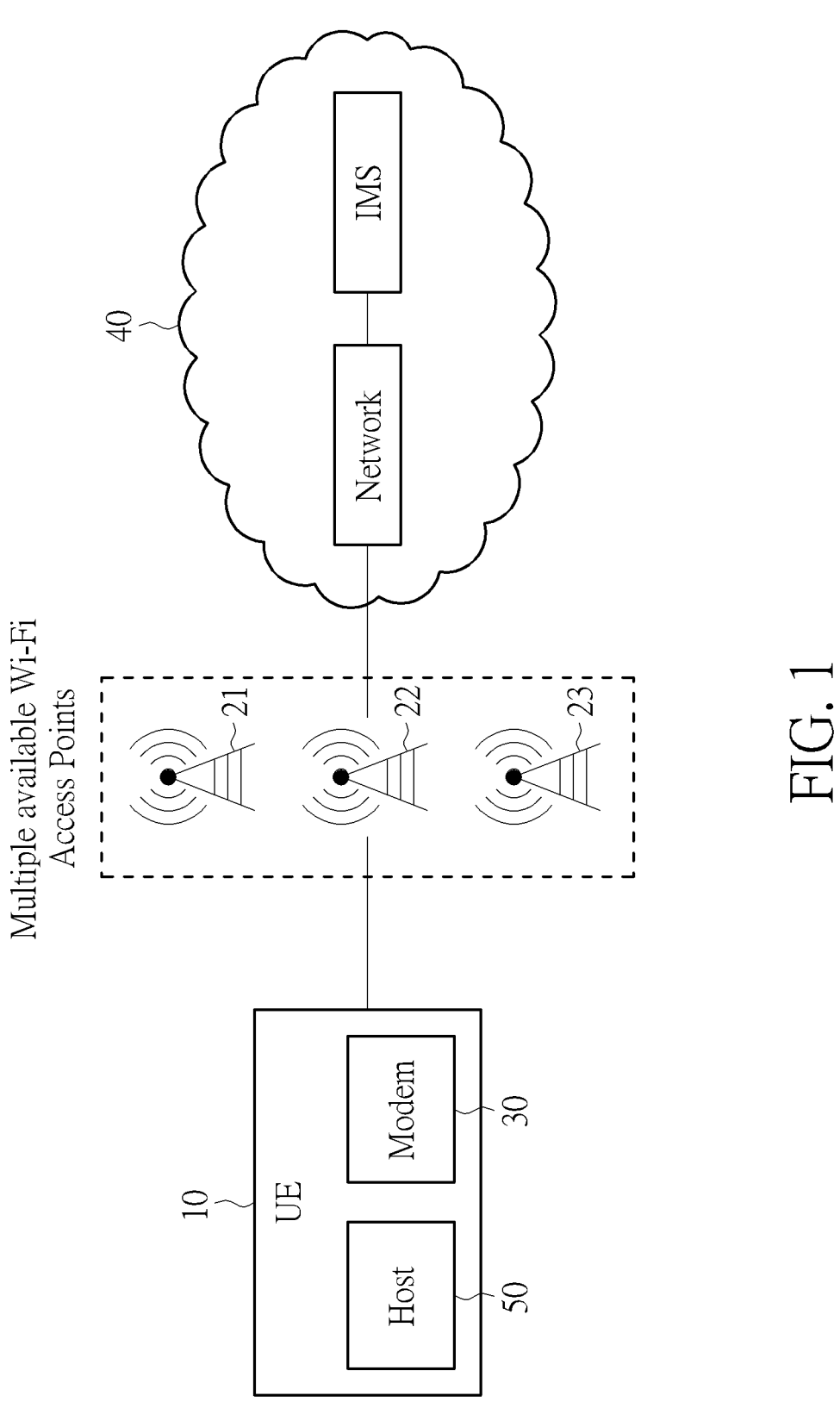
FIG. 1 depicts a scenario of user equipment with multiple available Wi-Fi access points of an embodiment of the present invention.

In the following detailed description, numerous specific details are set forth in order to provide a thorough understanding of the disclosure. However, it will be understood by those skilled in the art that the present disclosure may be practiced without these specific details. In other instances, well-known methods, procedures, components and circuits have not been described in detail so as not to obscure the present disclosure. It should be understood that the disclosure is described primarily in the context of interworking between a 3GPP specified wireless network (e.g., 4G and 5G) and an IEEE 802.11 specified wireless network (e.g., Wi-Fi), but it can be implemented in other forms of cellular or non-cellular wireless networks as well.

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi).

The following technique, apparatus and system can be applied to various wireless multiple access systems. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a system, and a Single Frequency Division Multiple Access (SC-FDMA) system. Carrier Frequency Division Multiple Access) systems, and MC-FDMA (Multi-Carrier Frequency Division Multiple Access) systems. CDMA may be implemented through a radio technology such as Universal Terrestrial Radio Access (UTRA) or CDMA2000. TDMA may be implemented through a radio technology such as Global System for Mobile communications (GSM), General Packet Radio Service (GPRS), or Enhanced Data rates for GSM Evolution (EDGE). OFDMA may be implemented through a wireless technology such as Institute of Electrical and Electronics Engineers (IEEE) 802.11 (Wi-Fi), IEEE 802.16 (WiMAX), IEEE 802.20, or Evolved UTRA (E-UTRA). UTRA is part of the Universal Mobile Telecommunications System (UMTS). 3rd Generation Partnership Project (3GPP) Long-Term Evolution (LTE) is a part of Evolved UMTS (E-UMTS) using E-UTRA. 3GPP LTE uses OFDMA in downlink (DL) and SC-FDMA in uplink (UL). Evolution of 3GPP LTE includes LTE-A (Advanced), LTE-A Pro, and/or 5G New Radio (NR).

As described by the 3GPP, different wireless communication systems standards and protocols can use various radio access networks (RANs) for communicating between a base station of the PAN (which may sometimes be referred to generally as a PAN node, a network node, or simply a node) and a wireless communication device known as user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

The RAN can include one or more access nodes, which may be referred to as base station, NodeB, evolved NodeB (eNB), next Generation NodeB (gNB), RAN nodes, controllers, transmission reception points (TRPs), and so forth, and can include ground stations (e.g., terrestrial access points) or satellite stations providing signal coverage within a geographic area (e.g., a cell).

A base station used by a RAN may correspond to that PAN. An example of an E-UTRAN base station is an Evolved Universal Terrestrial Radio Access Network (E-UTRAN) Node B (also referred to as evolved Node B, enhanced Node B, eNodeB, or eNB). Another example of an NG-RAN base station is a next generation Node B (also referred to as a gNodeB or gNB).

A PAN provides its communication services with external entities through its connection to a core network (CN). For example, E-UTRAN may utilize an Evolved Packet Core (EPC), while NG-RAN may utilize a 5G Core Network (5GC).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes referred to as LTE), and NG-RAN implements NR RAT (sometimes referred to as 5G RAT, 5G NR RAT, or NR). In certain deployments, the E-UTRAN may also implement NR RAT. In certain deployments, NG-RAN may also implement LTE RAT.

3GPP specifications provide details for access to the 3GPP core network (e.g., EPC and 5GC) via non-3GPP access networks (e.g., Wi-Fi). Two type of non-3GPP IP access networks are mentioned in the 3GPP specification, that is, trusted non-3GPP IP access network and untrusted non-3GPP IP access network.

For a trusted non-3GPP IP access network, the communication between the UE and the core network is secure. For an untrusted non-3GPP IP access network the communication between the UE and the core network is not trusted to be secure. Hence, for untrusted access via non-3GPP access network, an IPSec tunnel needs to be established between the UE and the core network for PDN/PDU session establishment.

The UE can establish a secure connection with the core network using IKEv2 protocol. IKEv2 can provide a secure method for negotiating and establishing cryptographic keys and security associations (SA) between two parties. SA is the establishment of shared security attributes (e.g., cryptographic algorithm, mode, etc.) between two network entities to support secure communication.

Internet Key Exchange (IKE) performs mutual authentication between two parties and establishes an IKE security association (IKE SA) that includes shared secret information for efficiently establishing child SAs and/or Internet Protocol Security SA (IPSEC SA). This can be used for Encapsulating Security Payload (ESP) or Authentication Header (AH). A set of cryptographic algorithms can be used by the child SAs to protect their carried traffic.

During authentication process, the UE and the network exchange authentication credentials and negotiate security parameters, such as encryption algorithms, integrity algorithms, Diffie-Hellman groups, and authentication methods.

This negotiation can ensure that both parties agree on a set of security policies for the IPSEC tunnel.

All IKE communications includes a message pair (i.e., a request and a response). The message pair may be referred to as an "exchange" or a "request/response pair". The first IKE exchange for establishing an IKE SA may be referred to as the IKE_SA_INIT and IKE AUTH exchanges. The subsequent IKE exchanges may be referred to as the CRE-ATE_CHILD_SA or INFORMATIONAL exchanges.

The term MOBIKE as used in this disclosure means IKEv2 Mobility and Multihoming Protocol, which is an extension of the Internet Key Exchange version 2 (IKEv2) protocol that allows hosts to update their IP addresses and traffic selectors without re-establishing the security association. This enables seamless mobility and multihoming for IPsec-based virtual private networks (VPNs). MOBIKE is defined in RFC 4555 and is compatible with both IPv4 and IPv6 networks. MOBIKE works by sending UPDATE messages between the peers (i.e., initiator and responder) to notify each other of the new addresses and selectors. The peers then verify the reachability of the new addresses by sending and receiving COOKIE messages. MOBIKE also supports dynamic address configuration using IKEv2 Configuration Payloads. MOBIKE can be used for various scenarios, such as roaming between different access networks, switching between multiple interfaces, or surviving network renumbering events.

IMS and/or SIP registration process is executed when IMS PDN is successfully established to access IMS services. When IMS PDN is established over WIFI and UE is registered to the IMS network and subscribed for voice services, it is considered as VoWiFi registered. The IMS registration procedure includes the IMS authentication, e.g., IMS-AKA, and security negotiation between UE and IMS network.

The MOBIKE procedures as implemented herein fall within the content of the RFC documents, particularly RFC 4555.

For terms and techniques not specifically described, reference may be made to wireless communication standard documents (e.g., 3GPP Specifications, RFC documents) issued before this specification.

In this specification, technical features that are individually described within one drawing may be implemented individually or simultaneously.

Although not limited thereto, the various descriptions, functions, procedures, suggestions, methods, and/or operation flowcharts disclosed herein may be applied to various fields requiring wireless communication and/or connection (e.g., Wi-Fi, 5G) between devices.

FIG. 1 depicts a scenario of user equipment (UE) 10 with multiple available Wi-Fi access points (APs) 21, 22 and 23 of an embodiment of the present invention. The UE 10 includes a host 50 (e.g., an application processor) and a modem 30. The host 50 is an application entity which provides IMS calling functionality. The UE 10 may be wirelessly connected to one of Wi-Fi APs 21, 22 or 23. The modem 30 functions as an interface for the UE 10 to be connected the network 40.

The modem 30 is an entity that provides the UE 10 capability to connect with the network 40. In some embodiments, it can be a separated from host 50. In some embodiments, it can be integrated with the host 50 making it as a single entity (e.g., System-on-Chip).

In some embodiments, the host 50 may be an application entity which provides IMS calling functionality. It also associates with Wi-Fi AP and provides Wi-Fi connectivity information to modem. The host 50 also has capability to select a Wi-Fi AP according to the network metrics provided by the modem 30.

In some embodiments, the modem 30 may be coupled to the host 50 for establishing connection with the IMS Network for IMS calling. The modem 30 can execute the MOBIKE procedure and sends the plurality of messages. Also, the modem 30 can observe the Network metrics of the plurality of messages.

The network 40 may include one or more core networks (CN), e.g., evolved packet core (EPC) and 5G core (5GC). The network 40 may also have the Internet Protocol (IP) Multimedia Subsystem (IMS) coupled to the core network. The details of the architecture are well-described in the 3GPP Specifications and will not be repeated herein.

Currently, Wi-Fi AP selection is generally performed by users. To improve the robustness of network connectivity, an automatic mechanism for the UE 10 to search and select intelligently for the Wi-Fi APs 21, 22 and 23 based on Wi-Fi network metrics is disclosed in the following paragraphs. This mechanism can be based on other Wi-Fi network metrics in addition to signal strength and allow VoWiFi service to be optimized.

FIG. 2 depicts a flowchart of the method 200 of Wi-Fi AP selection of an embodiment. The method 200 may include the following steps:

S202: Connect UE 10 with a first Wi-Fi AP 21;

S204: Exchange a plurality of first messages between the UE 10 and the network 40;

S206: Observe first network metrics of the plurality of first messages by the UE 10;

S208: Disconnect the first Wi-Fi AP and connecting a second Wi-Fi AP 22 with the UE 10;

S210: Execute the MOBIKE procedure;

S212: Exchange a plurality of second messages between the UE 10 and the network 40;

S214: Observe second network metrics of the plurality of second messages by the UE 10; and S216: Select a connection by the UE 10 to the first Wi-Fi AP 21, or the second Wi-Fi AP 22 according to the first network metrics and the second network metrics.

It should also be noted that IMS Public Data Network (PDN) connection between the UE 10 and the network 40 may need to be established and IMS registration to the network 40 may need to be completed before exchanging messages between the UE 10 and the network 40.

The messages exchanged between the UE 10 and the network 40 may include IKEv2 Dead Peer Detection (DPD) messages, Real-time Transport Control Protocol (RTCP) messages, Session Initiation Protocol (SIP) messages, or IP Multimedia Subsystem (IMS) data channel messages, etc. The network metrics for performance measurement may include round-trip time (RTT), packet loss rate and/or jitters. However, other types of messages and metrics are not excluded. The disclosure is not limited herein.

The first Wi-Fi AP 21 or the second Wi-Fi AP 22 may be selected according to which of the first network metrics and the second network metrics having better performance.

FIG. 3 depicts a flowchart of the method 300 of Wi-Fi AP selection of another embodiment. The method 300 may include the following steps:

S302: Connect UE 10 with a first Wi-Fi AP 21;

S303: Is the first Wi-Fi AP 21 connected to the UE 10? If so, proceed to S304; if not proceed to S308;

S304: Exchange a plurality of first messages between the UE 10 and the network 40;

S306: Observe first network metrics of the plurality of first messages by the UE 10;

S307: Disconnect the first Wi-Fi AP 21 with the UE 10;

S308: Connect a second Wi-Fi AP 22 with the UE 10;

S310: Execute the MOBIKE procedure;

S312: Exchange a plurality of second messages between the UE 10 and the network 40;

S314: Observe second network metrics of the plurality of second messages by the UE 10;

S315: Disconnect the second Wi-Fi AP 22 and connecting a third Wi-Fi AP 23 with the UE 10;

S316: Execute the MOBIKE procedure;

S318: Exchange a plurality of third messages between the UE 10 and the network 40;

S320: Observe third network metrics of the plurality of third messages by the UE 10; and S322: Select a connection by the UE 10 to the first Wi-Fi AP 21, the second Wi-Fi AP 22 or the third Wi-Fi AP 23 according to the first network metrics, the second network metrics and the third metrics.

It should also be noted that IMS Public Data Network (PDN) connection between the UE 10 and the network 40 may need to be established and IMS registration to the network 40 may need to be completed before exchanging messages between the UE 10 and the network 40.

The messages exchanged between the UE 10 and the network 40 may include IKEv2 Dead Peer Detection (DPD) messages, Real-time Transport Control Protocol (RTCP) messages, Session Initiation Protocol (SIP) messages, or IP Multimedia Subsystem (IMS) data channel messages, etc. The network metrics for performance measurement may include round-trip time (RTT), packet loss rate and/or jitters. However, other types of messages and metrics are not excluded. The disclosure is not limited herein.

The first Wi-Fi AP 21, the second Wi-Fi AP 22 or the third second Wi-Fi AP 23 may be selected according to which of the first network metrics, the second network metrics, and the third network metrics having better performance.

Figure 4:
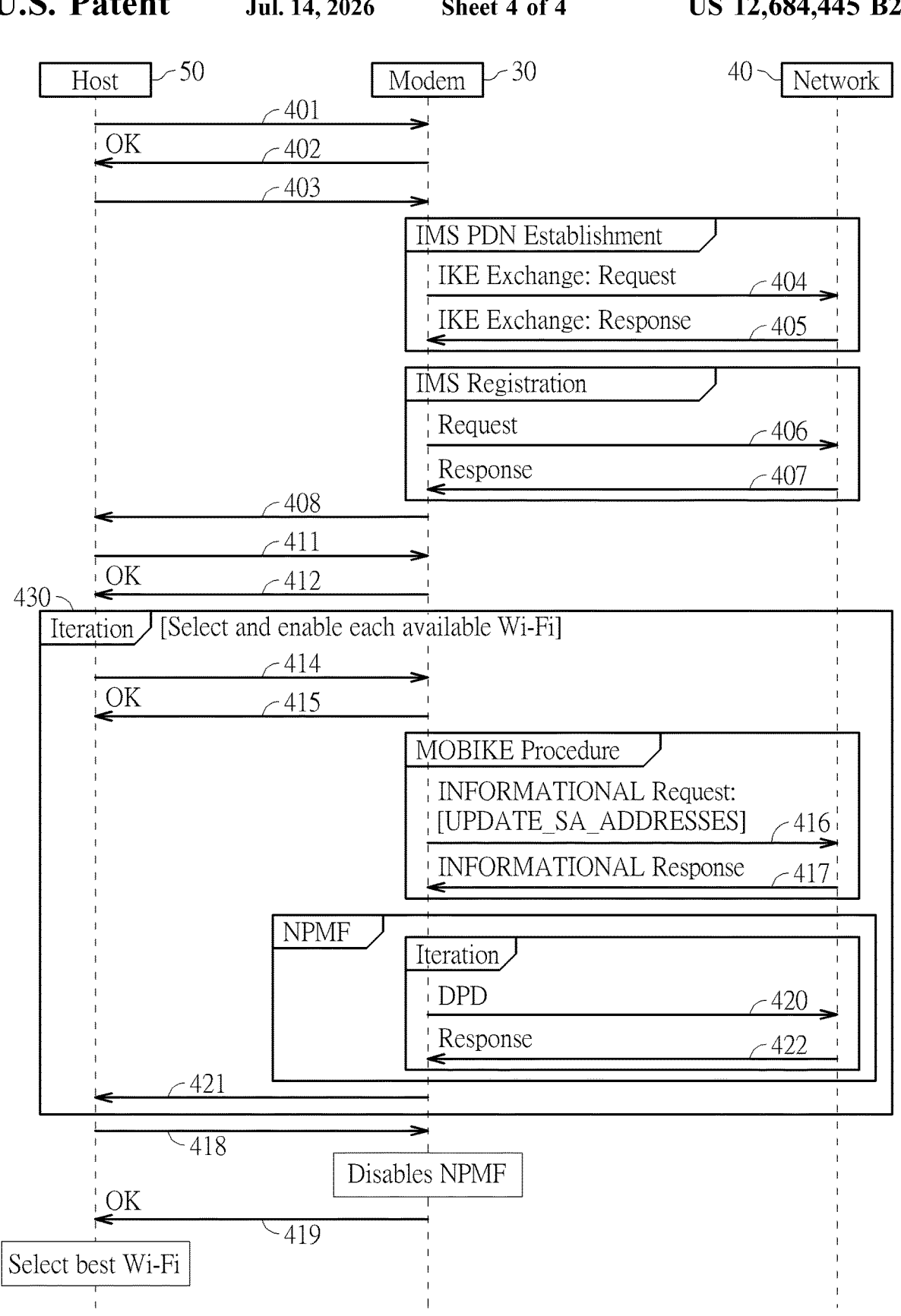
FIG. 4 depicts session information flow of Wi-Fi AP selection of an embodiment.

FIG. 4 depicts session information flow of Wi-Fi AP selection of an embodiment. Initially, the UE 10 may be connected to the Wi-Fi AP 21. The host 50 of the UE 10 may send a message 401 to the modem 30 for providing Wi-Fi connectivity status (e.g., Wi-Fi interface, IP addresses, etc.). The modem 30 may respond with OK by a message 402 for recognition. Then, the host 50 may send a message 403 to the modem 30 to request Wi-Fi calling capability (e.g., VoWiFi).

Following the request for Wi-Fi calling, the modem 30 performs IMS PDN establishment procedure. IMS PDN establishment procedure may include the modem 30 sending a message 404 to the network 40 with for Internet Key Exchange (IKE) request; the network 40 may respond with a message 405 that indicate its MOBIKE support capability. Next, the modem 30 may performs IMS registration with sending request 406 to and receiving response 407 from the network 40. When IMS registration 406 is completed, the modem 30 may send a response 408 back to the host 50 to indicate IMS being registered.

Subsequently, the host 50 may send a message 411 to the modem 30 to execute the Wi-Fi Selection Intelligence procedure. The modem 30 may respond with OK by a message 412 for recognition. The Wi-Fi Selection Intelligence procedure may iterate through each available Wi-Fi APs (e.g., the Wi-Fi AP 21, 22 and 23).

During iteration 430, the host 50 may send a message to the Modem 30 for providing Wi-Fi AP connectivity status. The modem 30 may respond with OK by a message 415 for recognition. At this point, the MOBIKE procedure may be executed. The modem 30 may send an informational request 416 to the network 40 containing the "UPDATE_SA_AD-DRESSES" notification. The request is sent using the current IP address. At this point, the UE 10 may also start to use the new address as a source address of its own outgoing traffic. Upon receiving the "UPDATE_SA_ADDRESSES" notification, the network 40 may record the new IP address and may send an informational response 417. Also, if required by policy, the network 40 may perform a return routability check of the IP address. When the check completes, the network 40 may start to use the IP address as the destination for its outgoing traffic.

Then, the modem 30 may execute network performance measuring function (NPMF) to measure network metrics. In some embodiments, the modem 30 may perform network performance measuring function by sending to the network 40 Dead Peer Detection (DPD) messages 420 and measuring its round-trip time (RTT), packet loss rate and/or jitters from the response 422. Furthermore, the modem 30 may perform the message exchange for N iterations (N being a positive integer, e.g., 10) to obtain more reliable measurement.

In some other embodiments, the modem 30 may execute network performance measuring function by sending to the network 40 Real-time Transport Control Protocol (RTCP) messages and measuring its RTT, packet loss rate and/or jitters. In some embodiments, Session Initiation Protocol (SIP) messages or IP Multimedia Subsystem (IMS) data channel messages can be implemented instead of DPD messages or RTCP messages. A performance index can be calculated according to the measured RTT, packet loss rate and/or jitters to quantify the network metrics suitable IMS calling.

Finally, the modem 30 may provide measurement information (e.g., performance index, network metrics) back to host 50 through a message 421.

After the first iteration, the UE 10 may disconnect from the Wi-Fi AP 21 and connect to the Wi-Fi AP 22. Then, the iteration 430 can be performed again for the Wi-Fi AP 22. The same or substantially identical procedure may be implemented to the Wi-Fi AP 23 and so on so forth. With each Wi-Fi AP 21, 22 or 23, a performance index for network metrics measurement is calculated by the UE 10.

At the end of the Wi-Fi Selection Intelligence procedure, the host 50 may send a message 418 to stop Wi-Fi Selection Intelligence procedure. The modem 30 may respond with OK by a message 419 for recognition. The UE 10 may choose which Wi-Fi AP 21, 22 or 23 to connect according to the performance indices or the network metrics most suitable for IMS calling.

It should be noted the above embodiments are mere examples for illustration purpose. Those skilled in the art may easily implement other network metrics with simple modifications for measuring network performance suitable for IMS calling. Thus, the present invention is not limited thereto.

The UE as described in this disclosure may include a device with radio communication capabilities. For example, the UE may include a smartphone (e.g., handheld touch-screen mobile computing devices connectable to one or more cellular networks). The UE may also include any mobile or non-mobile computing device, such as Personal Data Assistants (PDAs), pagers, laptop computers, desktop computers, wireless handsets, or any computing device that has a wireless communications interface.

The UE may also be referred to as a client, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE may include IoT UE, which can include a network access layer designed for low-power IoT applications utilizing short-lived UE connections. IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UE, which may include uniquely identifiable embedded computing devices (within the Internet infrastructure). The IoT UE may execute background applications (e.g., keep-alive messages, status updates, etc.) to facilitate the connections of the IoT network.

The terms "coupled", "connected", "connecting", "electrically connected", etc., are used interchangeably herein to generally refer to the condition of being electrically/electronically connected (through wire or wireless means). Similarly, a first entity is considered to be in "communication" or "connection" with a second entity (or entities) when the first entity electrically sends and/or receives (through wire or wireless means) information signals (containing voice information or non-voice data/control information) to/from the second entity regardless of the type (analog or digital) of those signals. It is further noted that various figures (including component diagrams) shown and discussed herein are for illustrative purpose only, and are not drawn to scale.

The various illustrative logical blocks, modules, processors, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

In some embodiments, the computers may be on a distributed computing network, such as one having any number of clients and/or servers. Each client may run software for implementing client-side portions of the embodiments. In addition, any number of servers may be provided for handling requests received from one or more clients. Clients and servers may communicate with one another via one or more electronic networks, which may be in various embodiments such as the Internet, a wide area network, a mobile telephone network, a wireless network (e.g., Wi-Fi, 5G, and so forth), or a local area network. Networks may be implemented using any known network protocols.

For situations in which the systems discussed above collect information about users, the users may be provided with an opportunity to opt in/out of programs or features that may collect personal information (e.g., information about a user's preferences or usage of a smart device). In addition, in some implementations, certain data may be anonymized in one or more ways before it is stored or used, so that personally identifiable information is removed. For example, a user's identity may be anonymized so that the personally identifiable information cannot be determined for or associated with the user, and so that user preferences or user interactions are generalized (for example, generalized based on user demographics) rather than associated with a particular user.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of Wi-Fi access point (AP) selection comprising:

connecting user equipment (UE) with a first Wi-Fi AP;

establishing connection with an IMS Network for establishing an IMS call;

exchanging a plurality of first messages between the UE and a network via the first Wi-Fi AP;

observing first network metrics of the plurality of first messages by the UE; and disconnecting the first Wi-Fi AP and connecting a second Wi-Fi AP with the UE for the observation of the second network metrics.

2. The method of claim 1 further comprising:

executing an IKEv2 Mobility and Multihoming Protocol (MOBIKE) procedure;

exchanging a plurality of second messages between the UE and the network; and observing second network metrics of the plurality of second messages by the UE.

3. The method of claim 2 further comprising selecting a connection by the UE to the first Wi-Fi AP or the second Wi-Fi AP according to the first network metrics and the second network metrics.

4. The method of claim 3, wherein the connection to the first Wi-Fi AP or the second Wi-Fi AP is selected according to which of the first network metrics and the second network metrics has better performance.

5. The method of claim 2, wherein the UE comprises:

a host for providing IMS calling functionality, Wi-Fi connectivity information to a modem and associating with the first Wi-Fi AP; and the modem coupled to the host, for establishing connection with the IMS Network, executing the MOBIKE procedure, sending the plurality of first messages and observing the first network metrics of the plurality of first messages;

wherein the host determines to disconnect the first Wi-Fi AP and connect the second Wi-Fi AP for the observation of the second network metrics from the modem.

6. The method of claim 1, wherein establishing connection with the IMS Network for establishing the IMS call comprising:

establishing an IMS Public Data Network (PDN) or Packet Data Unit (PDU) connection between the UE and the network.

7. The method of claim 6 further comprising:

establishing of IMS registration to the network and subscribing for IMS calling.

8. The method of claim 1, wherein the plurality of first messages comprise IKEv2 Dead Peer Detection (DPD) messages, Real-time Transport Control Protocol (RTCP) messages, Session Initiation Protocol (SIP) messages, or IP Multimedia Subsystem (IMS) data channel messages.

9. The method of claim 1, wherein the first network metrics comprise round-trip time (RTT), packet loss rate and/or jitters.

10. A method of Wi-Fi access point (AP) selection comprising:

connecting user equipment (UE) with a first Wi-Fi AP;

establishing connection with an IMS Network for establishing an IMS call;

disconnecting the first Wi-Fi AP and connecting a second Wi-Fi AP with the UE;

executing an IKEv2 Mobility and Multihoming Protocol (MOBIKE) procedure;

exchanging a plurality of second messages between the UE and a network; and observing second network metrics of the plurality of second messages by the UE.

11. The method of claim 10, wherein the UE comprises:

a host for providing IMS calling functionality, Wi-Fi connectivity information to a modem and associating with the first Wi-Fi AP; and the modem coupled to the host, for establishing connection with the IMS Network, executing the MOBIKE procedure, sending the plurality of first messages and observing the first network metrics of the plurality of first messages;

wherein the host determines to disconnect the first Wi-Fi AP and connect the second Wi-Fi AP for the observation of the second network metrics from the modem.

12. The method of claim 10, wherein establishing connection with the IMS Network for the IMS call comprising:

establishing an IMS Public Data Network (PDN) or Packet Data Unit (PDU) connection between the UE and the network.

13. The method of claim 12 further comprising:

establishing of IMS registration to the network and subscribing for IMS calling.

14. The method of claim 10 further comprising:

disconnecting the second Wi-Fi AP and connecting a third Wi-Fi AP with the UE;

executing an IKEv2 Mobility and Multihoming Protocol (MOBIKE) procedure;

exchanging a plurality of third messages between the UE and the network; and observing third network metrics of the plurality of third messages by the UE.

15. The method of claim 14 further comprising selecting a connection by the UE to the second Wi-Fi AP or the third Wi-Fi AP according to the second network metrics and the third network metrics.

16. The method of claim 10, wherein the plurality of second messages and the plurality of third messages comprise IKEv2 Dead Peer Detection (DPD) messages, Real-time Transport Control Protocol (RTCP) messages, Session Initiation Protocol (SIP) messages, or IP Multimedia Subsystem (IMS) data channel messages.

17. The method of claim 10, wherein the second network metrics and the third network metrics comprise round-trip time (RTT), packet loss rate and/or jitters.

18. A method of Wi-Fi access point (AP) iteration comprising:

connecting user equipment (UE) with a first Wi-Fi AP;

establishing connection with an IMS Network for establishing an IMS call;

disconnecting the connected Wi-Fi AP and connecting a next Wi-Fi AP with the UE;

executing an IKEv2 Mobility and Multihoming Protocol (MOBIKE) procedure;

exchanging a plurality of messages between the UE and a network; and observing network metrics of the plurality of messages by the UE.

19. The method of claim 18 further comprising selecting a connection by the UE to the Wi-Fi AP according to the network metrics of the Wi-Fi access points.

20. The method of claim 18, wherein the plurality of messages comprise IKEv2 Dead Peer Detection (DPD) messages, Real-time Transport Control Protocol (RTCP) messages, Session Initiation Protocol (SIP) messages, or IP Multimedia Subsystem (IMS) data channel messages.

21. The method of claim 18, wherein the network metrics comprise round-trip time (RTT), packet loss rate and/or jitters, etc.

22. The method of claim 18, wherein establishing connection with the IMS Network for establishing the IMS call comprising:

establishing an IMS Public Data Network (PDN) or Packet Data Unit (PDU) connection between the UE and the network.

23. The method of claim 18 further comprising:

establishing of IMS registration to the network and sub-
scribing for IMS calling.

* * * * *